(12) United States Patent
Yen et al.

(10) Patent No.: US 10,979,634 B2
(45) Date of Patent: Apr. 13, 2021

(54) IMAGE CAPTURE ASSEMBLY AND PORTABLE ELECTRONIC DEVICE

(71) Applicant: LUXVISIONS INNOVATION LIMITED, New Territories (HK)

(72) Inventors: Shih-Chieh Yen, New Territories (HK); Ting-Cheng Lee, New Territories (HK)

(73) Assignees: GUANGZHOU LUXVISIONS INNOVATION TECHNOLOGY LIMITED; GUANGZHOU HI-TECH INDUSTRIAL DEVELOPMENT

( * ) Notice: Subject to any disclaimer, the term of this patent is extended or adjusted under 35 U.S.C. 154(b) by 0 days.

(21) Appl. No.: 16/872,943

(22) Filed: May 12, 2020

(65) Prior Publication Data
US 2020/0275024 A1   Aug. 27, 2020

Related U.S. Application Data

(60) Provisional application No. 62/846,894, filed on May 13, 2019.

(51) Int. Cl.
*H04N 5/232* (2006.01)
*H04N 5/225* (2006.01)

(52) U.S. Cl.
CPC ....... *H04N 5/23238* (2013.01); *H04N 5/2254* (2013.01); *H04N 5/2258* (2013.01)

(58) Field of Classification Search
None
See application file for complete search history.

(56) References Cited

U.S. PATENT DOCUMENTS

| | | | |
|---|---|---|---|
| 9,549,107 B2 | 1/2017 | Georgiev | |
| 10,666,860 B2 * | 5/2020 | Takenaka | H04N 5/23238 |
| 2018/0204311 A1 * | 7/2018 | Kishine | H04N 5/217 |

* cited by examiner

*Primary Examiner* — Eileen M Adams
(74) *Attorney, Agent, or Firm* — Birch, Stewart, Kolasch & Birch, LLP.

(57) ABSTRACT

An image capture assembly includes a first optical module, a first image sensor, a second optical module, a second image sensor, and a data processing circuit. The first optical module captures an image in a first field-of-view and projects the image on the first image sensor, such that the first image sensor generates a first image frame. The second optical module captures another image in a second field-of-view and projects the another image on the second image sensor, such that the second image sensor generates a second image frame. The data processing circuit merges the first image frame and the second image frame in a longitudinal direction, to generate a combined image frame. The vertical resolution and the horizontal resolution of the combined image are configured in accordance with an aspect ratio of a display screen.

20 Claims, 14 Drawing Sheets

IMAGE CAPTURE ASSEMBLY AND PORTABLE ELECTRONIC DEVICE

CROSS-REFERENCE TO RELATED APPLICATION

This application claims an invention which was disclosed in Provisional Application No. 62/846,894, filed on May 13, 2019, entitled "PORTABLE ELECTRONIC DEVICE AND AN IMAGE CAPTURE ASSEMBLY WITH PERISCOPE LENS SET". The benefit under 35 USC § 119(e) of the United States provisional application is hereby claimed, and the aforementioned application is hereby incorporated herein by reference.

BACKGROUND

Technical Field

The disclosure relates to wide-viewing-angle photography, in particular to an image capture assembly and a portable electronic device utilizing the image capture assembly.

Related Art

Generally, in wide-viewing-angle photography, a wide-angle lens set having high-field-of-view (HFOV) is utilized to capture image, such that the angle-of-view of photography can be widened without lowering the magnification ratio. The angle-of-view of the wide-angle lens set usually reaches more than 120 degrees.

Referring to FIG. 1, image distortion occurs in the image captured in a wide-view-angle; in particular, the distortion becomes much worse at edges of the image. Moreover, a smaller object distance (image capture distance) results in worse distortion. As shown in FIG. 2, to obtain an image without the distortion, an image distortion correction is required to correct the image captured through wide-angle lens set, so as to correct the distortion in the image. However, in close-up photography with a small object distance, the image distortion becomes much worse, and it is difficult to correct the close-up captured image. Moreover, to correct the image that is seriously distorted, high computing power is required, which means that image correction for image seriously distorted is difficult to perform by a portable electronic device.

SUMMARY

In view of the problems, this disclosure discloses an image capture assembly and a portable electronic device utilizing the image capture assembly, for minimizing image distortion in the image captured through wide-viewing-angle photography.

At least one embodiment of this disclosure discloses an image capture assembly. The image capture assembly comprises a first optical module, a first image sensor, a second optical module, a second image sensor, and a data processing circuit.

The first image sensor is disposed corresponding to the first optical module. The first optical module is adapted to capture an image in a first field-of-view to project the image on the first image sensor, such that the first image sensor generates a first image frame. A vertical resolution of the first image frame is Y2 while a horizontal resolution of the first image frame is X2. The second image sensor is disposed corresponding to the second optical module. The second optical module is adapted to capture another image in a second field-of-view to project the another image on the second image sensor, such that the second image sensor generates a second image frame. The vertical resolution of the second image frame is Y3 while the horizontal resolution of the second image frame is X3. The first optical module and the second optical module are arranged in parallel to a longitudinal direction, and the vertical resolutions of the first image frame and the second image frame correspond to the longitudinal direction. The data processing circuit is electrically connected to the first image sensor and the second image sensor. The data processing circuit is adapted to merge the first image frame and the second image frame in the longitudinal direction to generate a combined image frame; wherein the vertical resolution of the combined image frame is Y1, the horizontal resolution of the combined image frame is X1; and Y1>X1.

A relation between the vertical resolutions and the horizontal resolutions is expressed by a mathematical formula:

$$\frac{Y2+Y3}{X2} > \frac{Y1}{X1}, \text{ and } X2 = X3.$$

In at least one embodiment of this disclosure, the image capture assembly further comprises a fixation member. The first optical module, the first image sensor, the second optical module, and the second image sensor are fixed on the fixation member.

In at least one embodiment of this disclosure, the first optical module includes a first prism and a first lens set located between the first prism and the first image sensor. The first prism is adapted to capture the image in the first field-of-view and projects the image on the first image sensor through the first lens set. The second optical module includes a second prism and a second lens set located between the second prism and the second image sensor. The second prism is adapted to capture the another image in the second field-of-view to project the another image on the second image sensor through the second lens set; wherein optical axes of the first lens set and the second lens set are arranged in parallel to the longitudinal direction.

In at least one embodiment of this disclosure, the first field-of-view and the second field-of-view overlap to define an overlapping angle.

In at least one embodiment of this disclosure, the overlapping angle falls within a range of −10-10 degrees with respect to an image capture direction of the image capture assembly.

In at least one embodiment of this disclosure, the first image frame and the second image frame overlap to define an overlapping section within the combined image frame, the vertical resolution of the overlapping section is ΔY, and $$\frac{Y2+Y3-\Delta Y}{X2} = \frac{Y1}{X1}.$$

At least one embodiment of this disclosure discloses a portable electronic device comprising the image capture assembly as described above and a display screen. The display screen has a display resolution measuring Y1 pixels in the longitudinal direction and X1 pixels in a horizontal direction, and Y1>X1. The data processing circuit is electrically connected to the display screen and adapted to drive the display screen to display the combined image frame.

In at least one embodiment of this disclosure, the portable electronic device further includes a case body. The case body includes a front side surface and a rear side surface. The display screen is disposed to the front side surface, and the image capture assembly is disposed to the case body.

In at least one embodiment of this disclosure, the display screen includes a first display module and a second display module, the first image frame is arranged to meet an aspect ratio of the first display module, and the second image frame is arranged to meet the aspect ratio of the second display module.

In at least one embodiment of this disclosure, the first display module and the second display module are arranged in parallel to the longitudinal direction.

In at least one embodiment of this disclosure, the first optical module and the second optical module perform capture the images from the rear side surface.

In at least one embodiment of this disclosure, the case body includes a first sub case body and a second sub case body, the first sub case body is pivoted to the second sub case body, the first display module is disposed to the first sub case body, and the second display module is disposed to the second sub case body.

In at least one embodiment of this disclosure, the image capture assembly is disposed to the first sub case body, and the first optical module and the second optical module capture the images from the front side surface.

In at least one embodiment of this disclosure, when the first sub case body is folded on the second sub case body with the first display module and the second display module respectively exposed on the first sub case body and the second sub case body, the data processing circuit disables the second display module and the second image sensor.

In at least one embodiment of this disclosure, the portable electronic device further comprises a hinge member. The hinge member is provided to pivot the first sub case body to the second sub case body, the image capture assembly is disposed to the hinge member, and the first optical module and the second optical module capture the images from the front side surface.

In this disclosure, the image capture assembly captures images by utilizing two optical modules having smaller field-of-views, and then merges the captured images into a combined image frame equivalent to an image captured in a wide-view-angle. In comparison with a wide-view-angle image captured by a single optical module, image distortions in images captured within close range by the two optical modules of this disclosure are much less, and the image distortion correction becomes easier to do, so as to reduce the processing load of computing when the data processing circuit executes image processing. Moreover, in some embodiments of this disclosure, by changing the arrangement of the image sensors in the longitudinal direction and the horizontal direction, aspect ratio of the combined image frame generated by the image capture assembly can be easily changed, and the same image sensors can be adapted to display screens having different aspect ratios.

BRIEF DESCRIPTION OF THE DRAWINGS

This disclosure will become more fully understood from the detailed description given herein below for illustration only, and thus not limitative of this disclosure, wherein.

DETAILED DESCRIPTION

As used hereinafter, the term "module" refers to an application specific integrated circuit (ASIC), an electronic circuit, a microprocessor, a chip that executes one or more software or firmware programs, or a combinational logic circuit. The module is configured to execute various algorithms, transforms, and/or logical processes to generate one or more signals. When a module is implemented in software, the module can be readable instruction stored in memory for execution by the chip or the combinational logic circuit.

Figure 2:
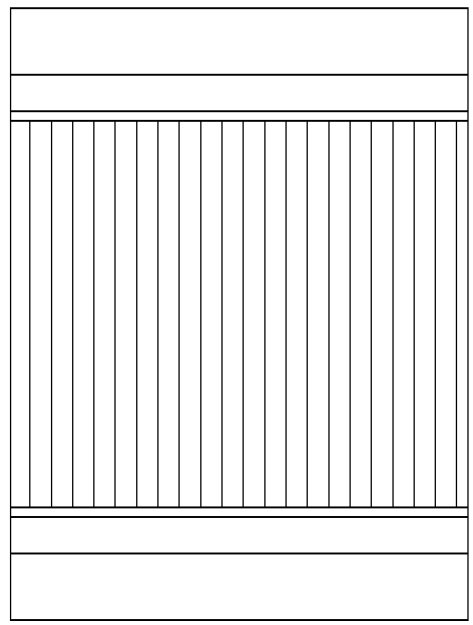
FIG. 2 is a schematic view illustrating distorted image that has been corrected.
Figure 1:
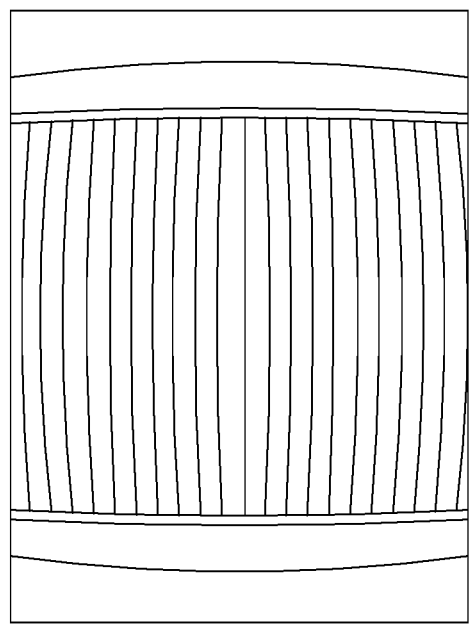
FIG. 1 is a schematic view illustrating image distortion of wide-viewing-angle photography in the prior art.
Figure 4:
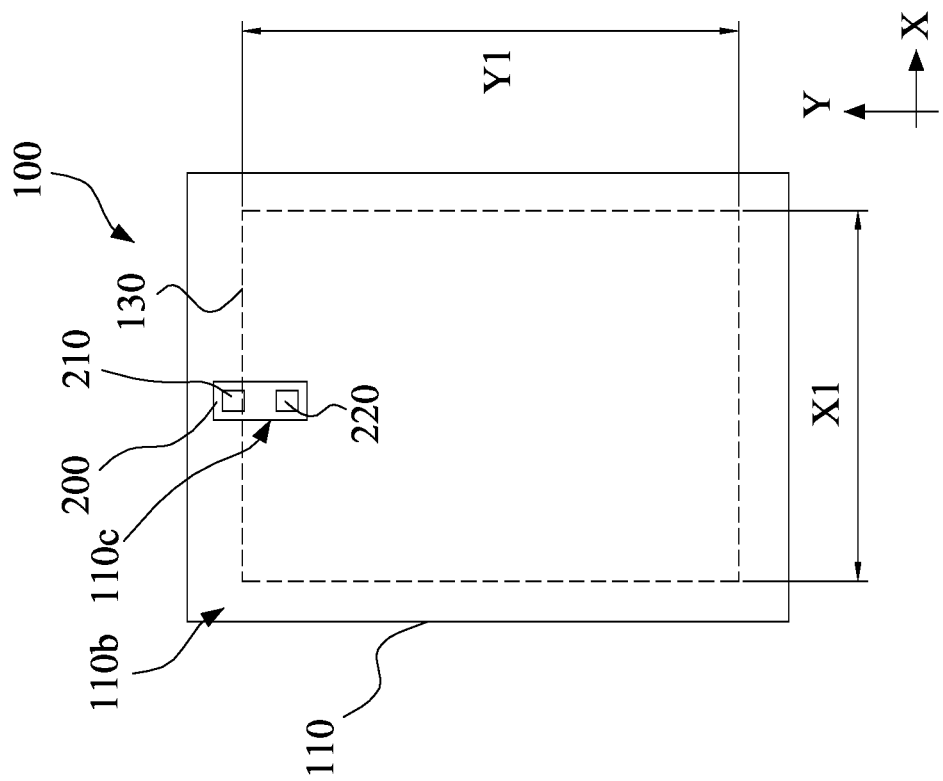
FIG. 4 is a rear view of a portable electronic device according to the first embodiment.
Figure 3:
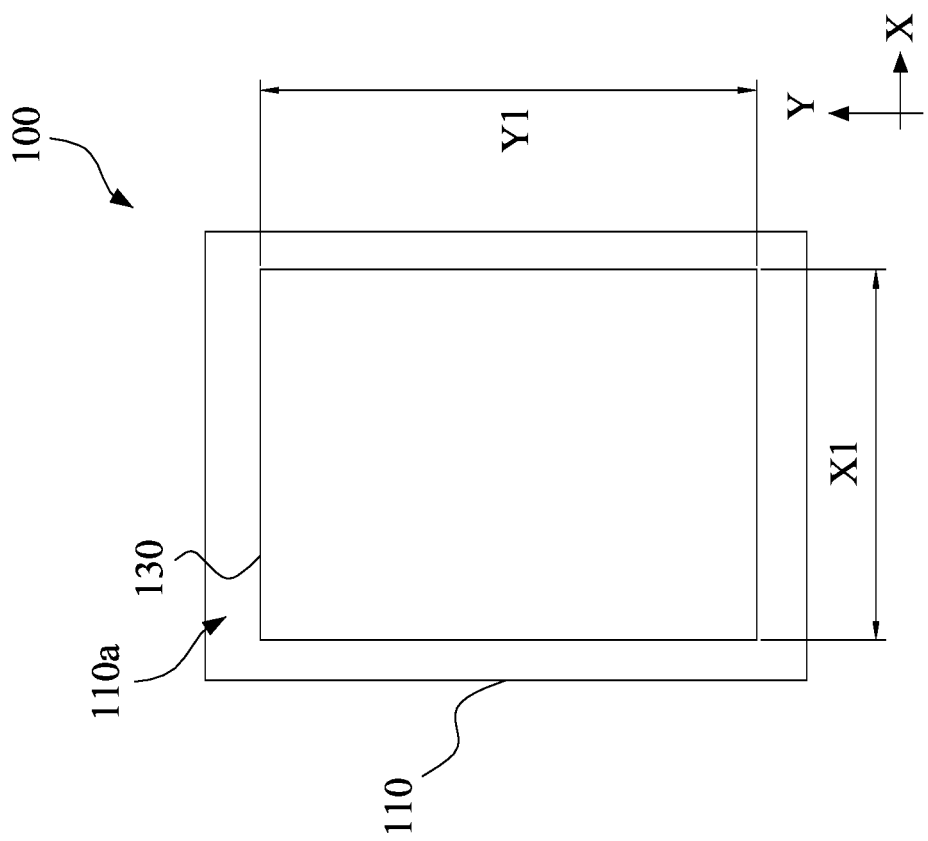
FIG. 3 is a front view of a portable electronic device according to a first embodiment.
Figure 5:
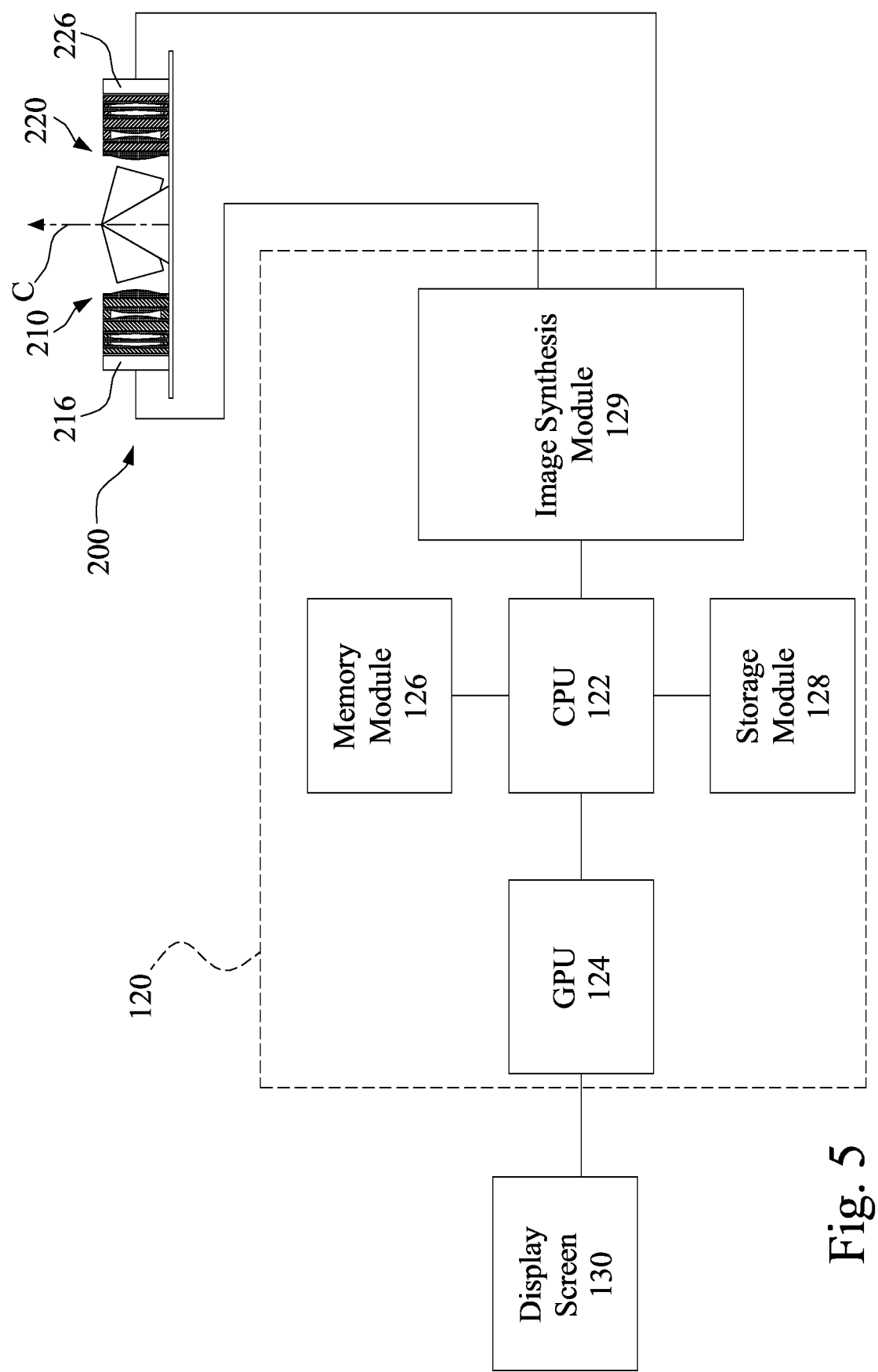
FIG. 5 is a circuit block diagram of the portable electronic device according to the first embodiment.

Please refer to FIG. 3, FIG. 4, and FIG. 5, a portable electronic device 100 according to a first embodiment of this disclosure is illustrated. The portable electronic device 100 includes a case body 110, an image capture assembly 200, a data processing circuit 120, and a display screen 130. The image capture assembly 200 is adapted to capture images and transform and encode the images into corresponding electrical signals. The electrical signals are provided for the data processing circuit to drive the display screen 130 to display the captured images. The image can be a picture or a dynamic video. The portable electronic device 100 can be, but not limited to, a smart phone, a tablet computer, or a laptop computer.

As shown in FIG. 3, FIG. 4, and FIG. 5, the case body 110 includes a front side surface 110a and a rear side surface 110b. The data processing circuit 120 is disposed in the case body 110. In some embodiments, the data processing circuit 120 includes a central processing unit (CPU) 122, a graphic processing unit (GPU) 124, a memory module 126, a storage module 128, and an image synthesis module 129. The CPU 122 loads instructions from the storage module 128 and executes the instructions by utilizing the memory module 126 as temporary storage space, so as to drive the GPU 124 and the image synthesis module 129 to execute required tasks. The image synthesis module 129 can be a combinational logic circuit, or a module implemented by instructions executed in the memory module 126 by the CPU 122, the GPU 124, and/or other the chip.

As shown in FIG. 3 and FIG. 5, the display screen 130 is disposed to the front side surface 110a of the case body 110 and electrically connected to the GPU 124 of the data processing circuit 120, so as to be driven by the GPU 124 to display images. The display screen 130 has a display resolution measuring Y1 pixels in the longitudinal direction Y and X1 pixels in a horizontal direction X. Wherein Y1>X1, the longer side of the display screen is arranged corresponding to the longitudinal direction Y, and the shorter side of the display screen 130 is arranged corresponding to the horizontal direction X.

As shown in FIG. 4 and FIG. 5, in the first embodiment, the image capture assembly 200 is disposed in the case body 110, and capture images in an image capture direction C from the rear side surface 110b through a window 110c of the case body 110.

As shown in FIG. 5, the image capture assembly 200 is electrically connected to the data processing circuit 120, in particular, electrically connected to the image synthesis module 129. In different embodiments, the image capture assembly 200 captures images from the front side surface 110a of the case body 110, the image capture assembly 200 is located aside the display screen 130 or hidden under the display screen 130.

Figure 6:
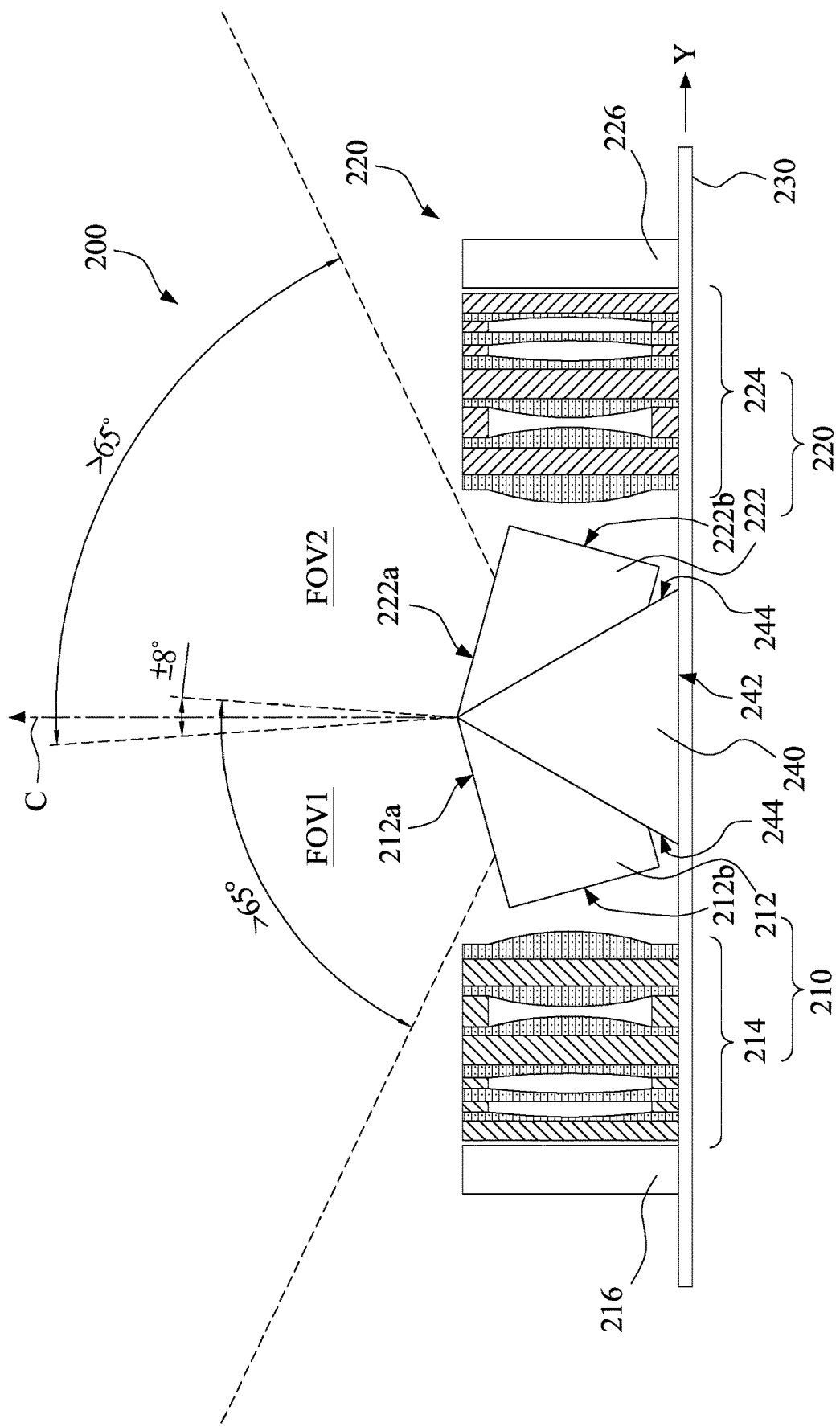
FIG. 6 is a schematic view illustrating a first field-of-view, a second field-of-view, and an overlapping angle of an image capture assembly according to the first embodiment.

Please refer to FIG. 6; the image capture assembly includes a first optical module 210, a first image sensor 216, a second optical module 220, and a second image sensor 226. The image capture assembly 200 further includes a fixation member 230, and the first optical module 210, the first image sensor 216, the second optical module 220, and the second image sensor 226 are fixed on the fixation member 230. In one example the fixation member 230 is a board, and the board is fixed inside the case body 110, so as to fix the image capture assembly 200 to the case body 110. In another example, the fixation member 230 is a part of the case body 110, and the image capture assembly 200 is directly attached to the inner wall of the case body 110.

As shown in FIG. 6, the first optical module 210 includes a first prism 212 and a first lens set 214. The first image sensor 216 is disposed corresponding to the first optical module 210; in particular, located at the image side of the first lens set 214. The first prism 212 is located at the object side of the first lens set 214, that is, the first lens set 214 is located between the first prism 212 and the first image sensor 216. The first prism 212 has a first incidence plane 212a and a first emergence plane 212b. In condition that the image capture assembly 200 captures images from the front side surface 110a of the case body 110, the first incidence plane 212a approximately faces ahead from the front side surface 110a of the case body 110 to receive incident light, and the first emergence plane 212b faces the object side of the first lens set 214. In condition that the image capture assembly 200 captures images from the rear side surface 110b of the case body 110, the first incidence plane 212a approximately faces ahead from the rear side surface 110b of the case body 110 to receive the incident light, the incident light is refracted and reflected in the first prism 212 to form refracted light, and the refracted light leaves the first prism 214 from the first emergence plane 212b and enters the first lens set 214, such that an image captured by the first prism 212 is projected on the first image sensor 216 by the first lens set 214.

As shown in FIG. 6, the image capture assembly 200 further includes a prism mount 240 disposed on the fixation member 230. The prism mount 240 has a triangular cross-section defined by a bottom surface 242 and two inclined surfaces 244. The bottom surface 242 of the prism mount 240 is fixed on the fixation member 230, and the first prism 212 is fixed on one of the two inclined surfaces 244 of the prism mount 240.

As shown in FIG. 6, the first lens set 214 includes a plurality of lenses and a focusing mechanism, the lenses are arranged in an optical axis, and the optical axis is arranged in parallel to the longitudinal direction Y. The focusing mechanism can be but not limited to a voice-coil-motor. The focusing mechanism is provided to shift at least one of the lenses, so as to adjust the effective focal length of the plurality of lenses. In the optical axis, the first prism 212 is located at the object side of the first lens set 214, and the first image sensor 216 is located at the image side of the first lens set 214. The first image sensor 216 can be but not limited to a CCD array or a CMOS array. The first image sensor 216 is disposed on the fixation member 230 and roughly perpendicular to the fixation member 230, such that the sensing surface of the first image sensor 216 is perpendicular to the optical axis. The first lens set 214 receives the refracted light from the first emergence plane 212b of the first prism 212 and projects images on the first image sensor 216. In some embodiments, the first lens set 214 is not equipped with focusing mechanism, and the first lens set 214 is a fixed-focus (FF) lens set. In some embodiments, the first lens set 214 further includes a lens barrel, and the lenses are disposed inside the lens barrel. In some embodiments, the first lens set 214 includes plural sub-lens-sets. Each sub-lens-set includes at least one lens and a lens barrel for receiving the lens, and the lens barrels of the sub-lens-sets are connected to each other.

Figure 7:
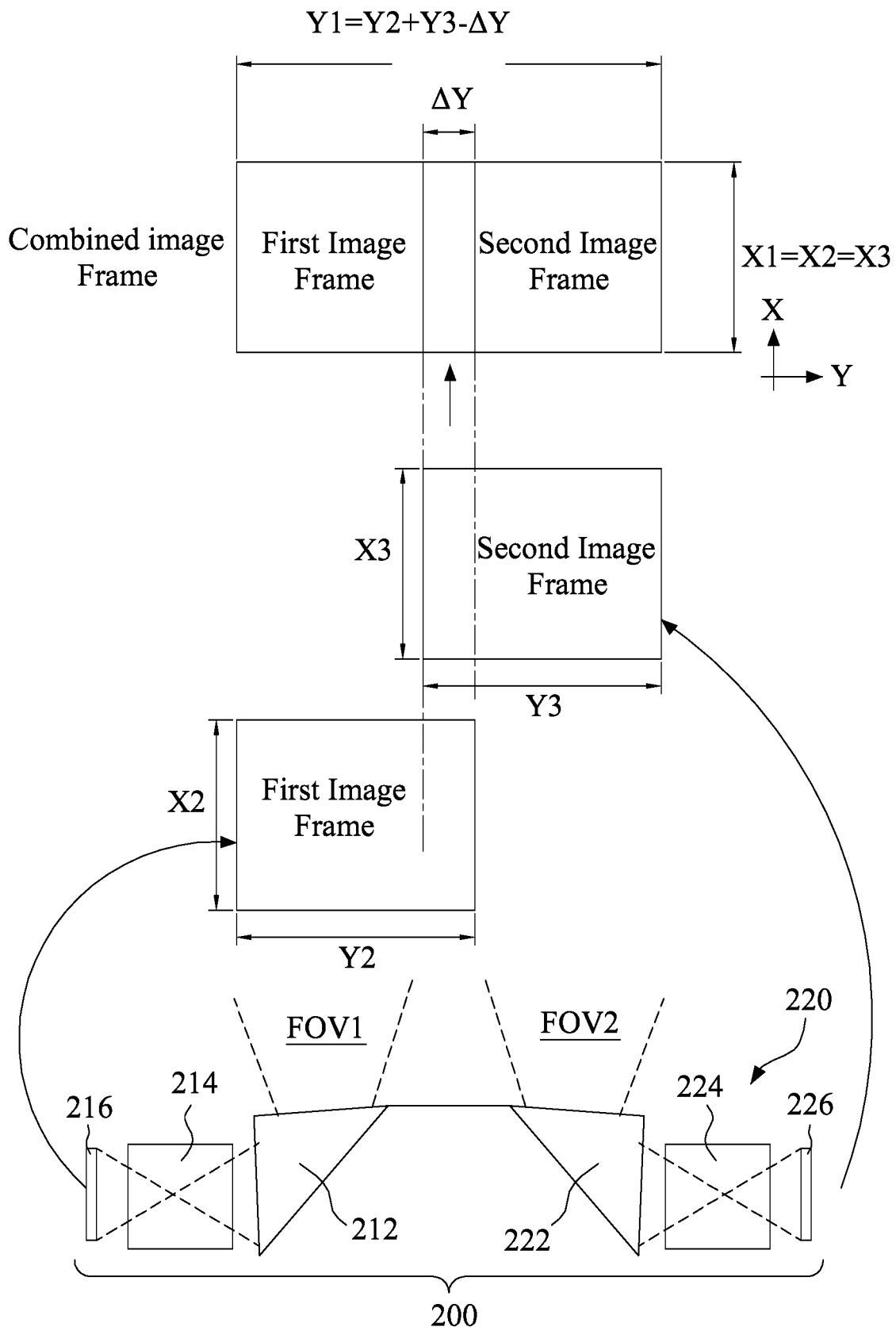
FIG. 7 is a schematic view illustrating the first field-of-view, the second field-of-view, a first image frame, a second image frame, and a combined image frame of the image capture assembly according to the first embodiment.

As shown in FIG. 6 and FIG. 7, the first prism 212 and the first lens set 214 are combined to form a periscope lens set. Through the combination of the first prism 212 and the first lens set 214, the first optical module 210 has a first field-of-view FOV1 in front of the first incidence plane 212a. The first optical module 210 captures an image in the first field-of-view FOV1 and projects the image on the first image sensor 216, such that the first image sensor 216 generates a first image frame.

As shown in FIG. 6, with respect to the prism mount 240, the second optical module 220 and the first optical module 210 are in mirror symmetry; but the arrangement of the first optical module 210 and second optical module 220 is not limited to mirror symmetry. Furthermore, the first optical module 210 and the second optical module 220 are not required to be identical. The second optical module 220 includes a second prism 222 and a second lens set 224. The second image sensor 226 is disposed corresponding to the second optical module 220 and, in particular, located at the image side of the second lens set 224. The second prism 222 is fixed on the other one of the two inclined surfaces 244 of the prism mount 240 and located at the object side of the second lens set 224; that is, the second lens set 224 is located between the second prism 222 and the second image sensor 226. The second prism 222 has a second incidence plane 222a and a second emergence plane 222b. In condition that the image capture assembly 200 captures images from the front side surface 110a of the case body 110, the second incidence plane 222a approximately faces ahead from the front side surface 110a of the case body 110 to receive the incident light. In condition that the image capture assembly 200 captures images from the rear side surface 110b of the case body 110, the second incidence plane 222a approximately faces ahead from the rear side surface 110b of the case body 110 to receive the incident light. The refracted light leaves the second prism 222 from the second emergence plane 222b and enters the second lens set 224, such that another image captured by the second prism 222 is projected on the second image sensor 226 by the second lens set 224.

As shown in FIG. 6, the second lens set 224 also includes a plurality of lenses and a focusing mechanism, the lenses of the second lens set 224 are arranged in another optical axis, and the optical axis is arranged in parallel to the longitudinal direction Y. In the optical axis, the second prism 222 is located at the object side of the second lens set 224, and the second image sensor 226 is located at the image side of the second lens set 224. The second image sensor 226 is disposed on the fixation member 230 and roughly perpendicular to the fixation member 230, such that the sensing surface of the second image sensor 226 is perpendicular to the optical axis. The second lens set 224 receives the refracted light from the second emergence plane 222b of the second prism 222 to project the another image on the second image sensor 226. In some embodiments, the second lens set 224 is not equipped with focusing mechanism, that is, the second lens set 224 is a fixed-focus (FF) lens set. In some embodiments, the second lens set 224 further includes a lens barrel, and the lenses are disposed inside the lens barrel. In some embodiments, the second lens set 224 includes plural sub-lens-sets. Each sub-lens-set includes at least one lens and a lens barrel for receiving the lens, and the lens barrels of the sub-lens-sets are connected to each other. In some embodiments, the first optical module 210 is not equipped with the first prism 212 and is only equipped with the first lens set 214, and the second optical module 220 is not equipped with the second prism 222 and is only equipped with the second lens set 224. The first image sensor 216 and the second image sensor 226 are disposed side by side on the fixation member 230, and the first lens set 214 and the second lens set 224 are disposed side by side facing ahead from the front side surface 110a or the rear side surface 110b of the case body 110.

As shown in FIG. 6 and FIG. 7, the second prism 222 and the second lens set 224 are combined to form another periscope lens set. Through the combination of the second prism 222 and the second lens set 224, the second optical module 220 has a second field-of-view FOV2 in front of the second incidence plane 222a. The second optical module 220 captures another image in the second field-of-view FOV2 and projects the another image on the second image sensor 226, such that the second image sensor 226 generates a second image frame.

Figure 8:
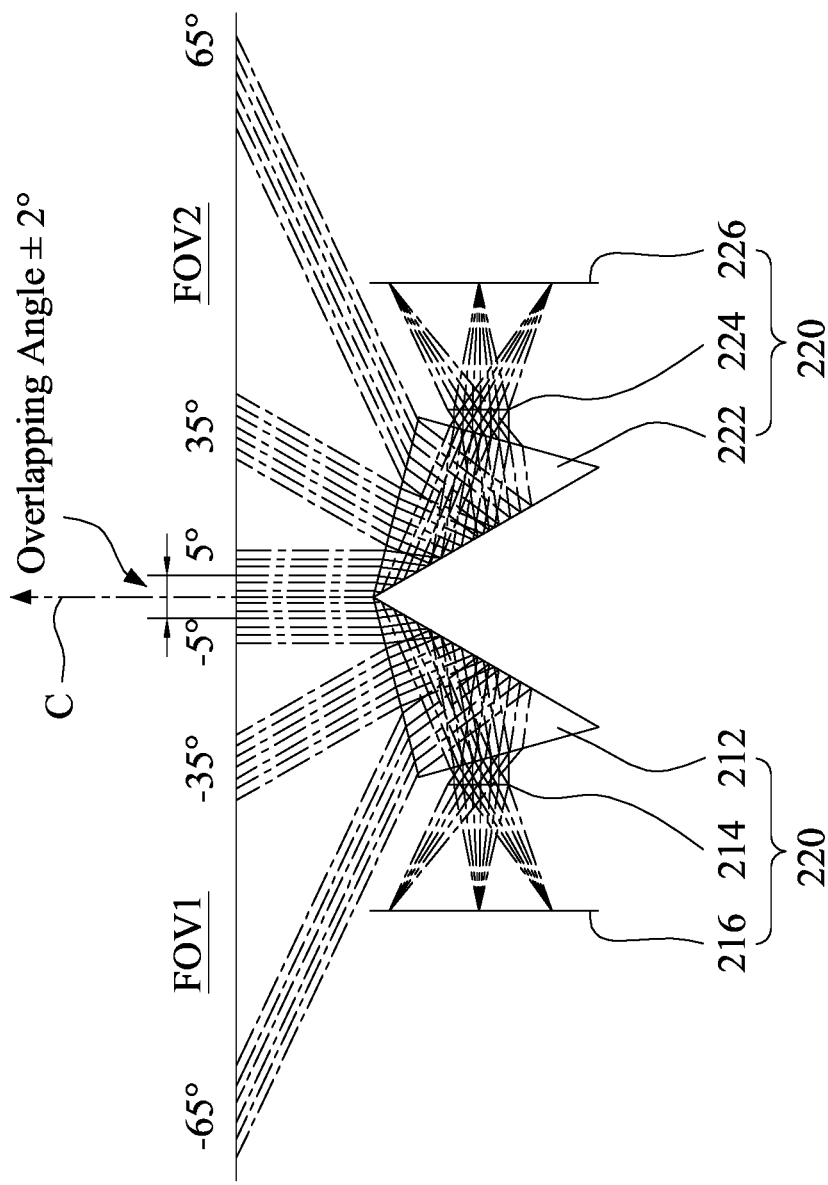
FIG. 8 is another schematic view illustrating the first field-of-view, the second field-of-view, and the overlapping angle of the image capture assembly according to the first embodiment.

As shown in FIG. 6 and FIG. 8, in the first embodiment, the first optical module 210 and the second optical module 220 respectively has a field-of-view with relatively narrow angle-of-view. The first field-of-view FOV1 and the second field-of-view FOV2 overlap to define an overlapping angle. The overlapping angle falls within a range of −10-10 degrees with respect to an image capture direction C of the image capture assembly 200. The overlapping angle is adapted for an allowance for assembly parts, to prevent a gap incapable of imaging from occurring between images captured by the first optical module 210 and the second optical module 220 due to the assembly tolerance or the dimensional tolerance assigned to the first optical module 210 and the second optical module 220. In the condition that the assembly tolerance or the dimensional tolerance is smaller, the range of the overlapping angle can be narrowed. For example, as shown in FIG. 6, the overlapping angle falls within a smaller range of −8-8 degrees, and, as shown in FIG. 8, the overlapping angle falls within a much smaller range of −2-2 degrees.

As shown in FIG. 6 and FIG. 8, the angles-of-view of the first field-of-view FOV1 and the second field-of-view FOV2 are respectively greater than 65 degrees. After the first field-of-view FOV1 and the second field-of-view FOV2 moderately overlap to define the overlapping angle, a greater field-of-view with an angle-of-view of 130 degree is implemented for wide-viewing-angle photography. The field-of-views FOV1, FOV2 of the first optical module 210 and the second optical module 220 are arranged to have relative small angles; therefore, when capturing images with small object distances, the image distortions of the first image frame and the second image frame obtained through the first optical module 210 and the second optical module 220 are much less, and the image distortion correction becomes easier to do, so as to reduce the processing load of computing when the data processing circuit 120 executes image processing. Therefore, in comparison with a wide field-of-view image capture of a single optical module, the combination of the first optical module 210 and the second optical module 220 would be more suitable for close-up photography.

As shown in FIG. 3 and FIG. 4, the first optical module 210 and the second optical module 220 are arranged in a direction in parallel to the longitudinal direction Y. Usually, the longitudinal direction Y corresponds to the longer side of the display screen 130. In other words, the first optical module 210 and the second optical module 220 are arranged in a direction in parallel to the longer side of the display screen 130.

Figure 9:
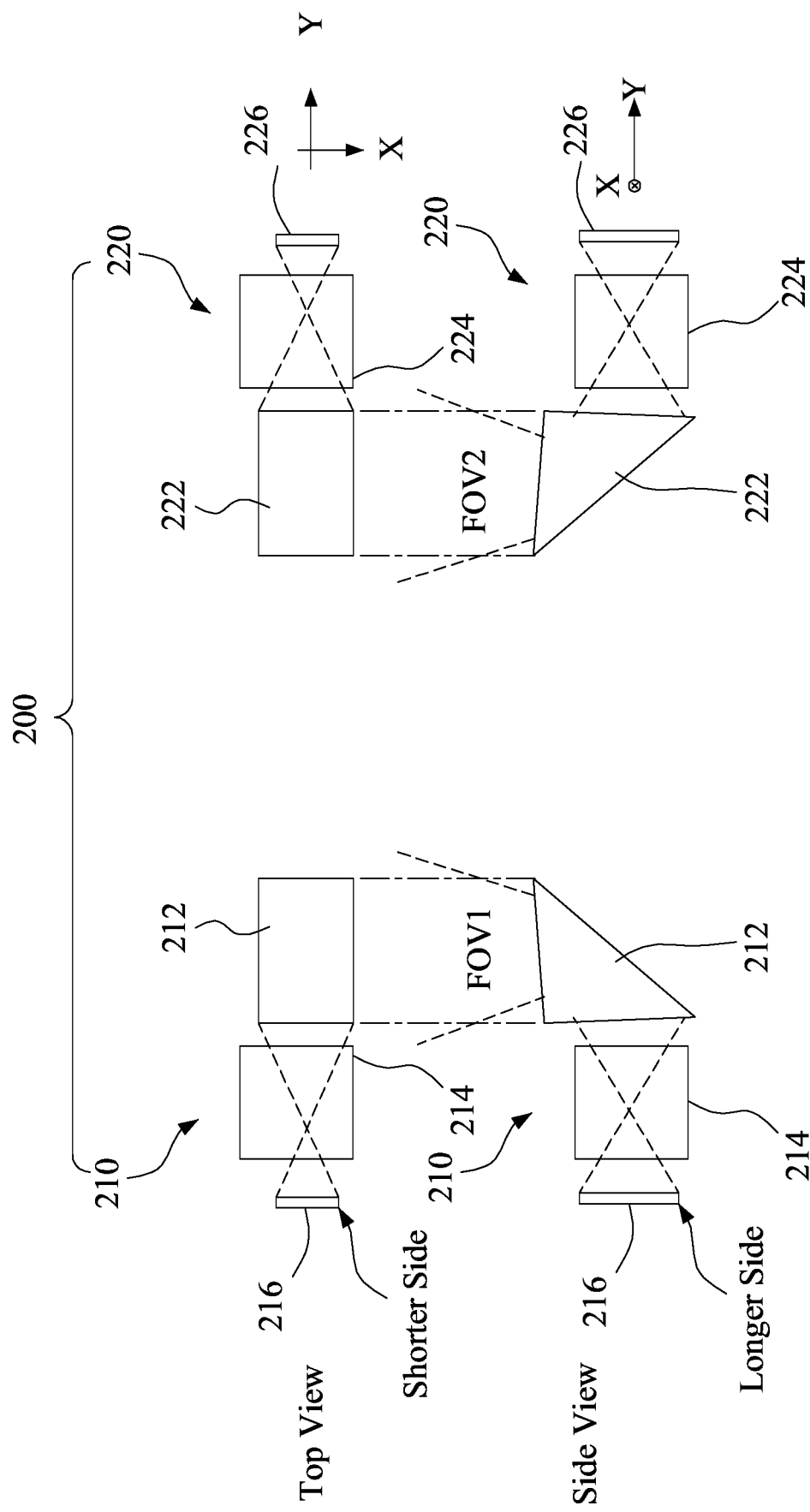
FIG. 9 illustrates a top view and a side view of a first optical module, a first image sensor, a second optical module, and a second image sensor according to the first embodiment.

As shown in FIG. 7 and FIG. 9, a vertical resolution of the first image frame is Y2 while a horizontal resolution of the first image frame is X2. Usually, the resolutions of the first image frame are arranged to be Y2>X2. A common ratio of Y2:X2 is about 4:3, but the ratio of Y2:X2 is not limited thereto. Similarly, a vertical resolution of the second image frame is Y3 while a horizontal resolution of the second image frame is X3. Usually, the resolutions of the second image frame are arranged to be Y3>X3. A common ratio of Y3:X3 is about 4:3, but the ratio of Y3:X3 is not limited thereto.

As shown in FIG. 3, FIG. 4, FIG. 7 and FIG. 9, the vertical resolutions Y2, Y3 of the first image frame and the second image frame correspond to the longitudinal direction Y, and the horizontal resolutions X2, X3 of the first image frame and the second image frame correspond to the horizontal direction X.

As shown in FIG. 5 and FIG. 7, the image synthesis module 129 of the data processing circuit 120 is electrically connected to the first image sensor 216 and the second image sensor 226. The image synthesis module 129 receives the first image frame and the second image frame, and then combined the first image frame and the second image frame in the longitudinal direction Y to generate a combined image frame. The CPU 122 drives the GPU 124 to generate display signals, so as to drive the display screen 130 to display the combined image frame.

As shown in FIG. 7, the resolutions of the combined image frame have to meet the display resolutions of the display screen 130. Through the combination process of the image synthesis module 129, the vertical resolution of the combined image frame is Y1, the horizontal resolution of the combined image frame is X1, and Y1>X1. The vertical resolution of the combined image frame corresponds to the longer side of the display screen 130, and the horizontal resolution of the combined image frame corresponds to the shorter side of the display screen 130.

To meet the needs of the combination process, a relation between the vertical resolutions and the horizontal resolutions of the first image frame, the second image frame, the combined image frame, and the display screen 130 is expressed by a mathematical formula:

$$\frac{Y2+Y3}{X2}=\frac{Y1}{X1}, \text{ and } X2=X3.$$

For example, in the case that the aspect ratio Y1:X1 of the display screen 130 is about 8:3 and the overlapping angle is ignored, the aspect ratios of the first image frame and the second image frame are arranged to be Y2:X2=Y3:X3=4:3.

In practice, the overlapping angle is required for the allowance for assembly parts, Y2:X2 or Y3:X3 has to be slightly larger than 4:3, so that the mathematical formula expressing the relation between the vertical resolutions and the horizontal resolutions is modified as follows:

$$\frac{Y2+Y3}{X2}>\frac{Y1}{X1}, \text{ and } X2=X3.$$

In this embodiment, because of the overlapping angle, when generating the combined image frame, the first image frame and the second image frame overlap to define an overlapping section in the longitudinal direction Y, and the combined image frame includes the overlapping section of the first image frame and the second image frame. Provided that the vertical resolution of the overlapping section is ΔY, the mathematical formula expressing the relation between the vertical resolutions and the horizontal resolutions is modified as follows:

$$\frac{Y2+Y3-\Delta Y}{X2}=\frac{Y1}{X1}, \text{ and } X2=X3.$$

Figure 10:
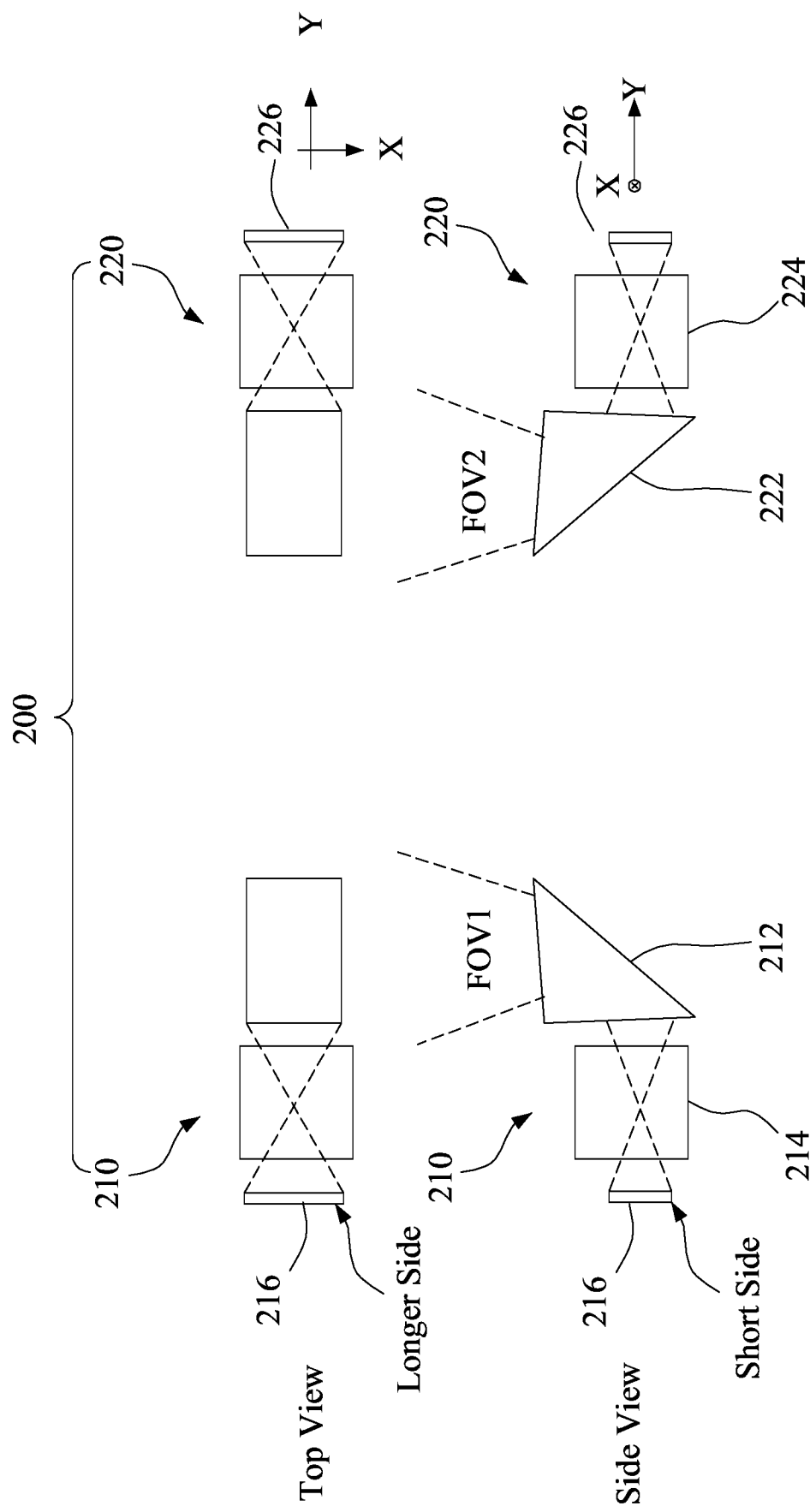
FIG. 10 illustrates another top view and another side view of the first optical module, the first image sensor, the second optical module, and the second image sensor according to the first embodiment.
Figure 11:
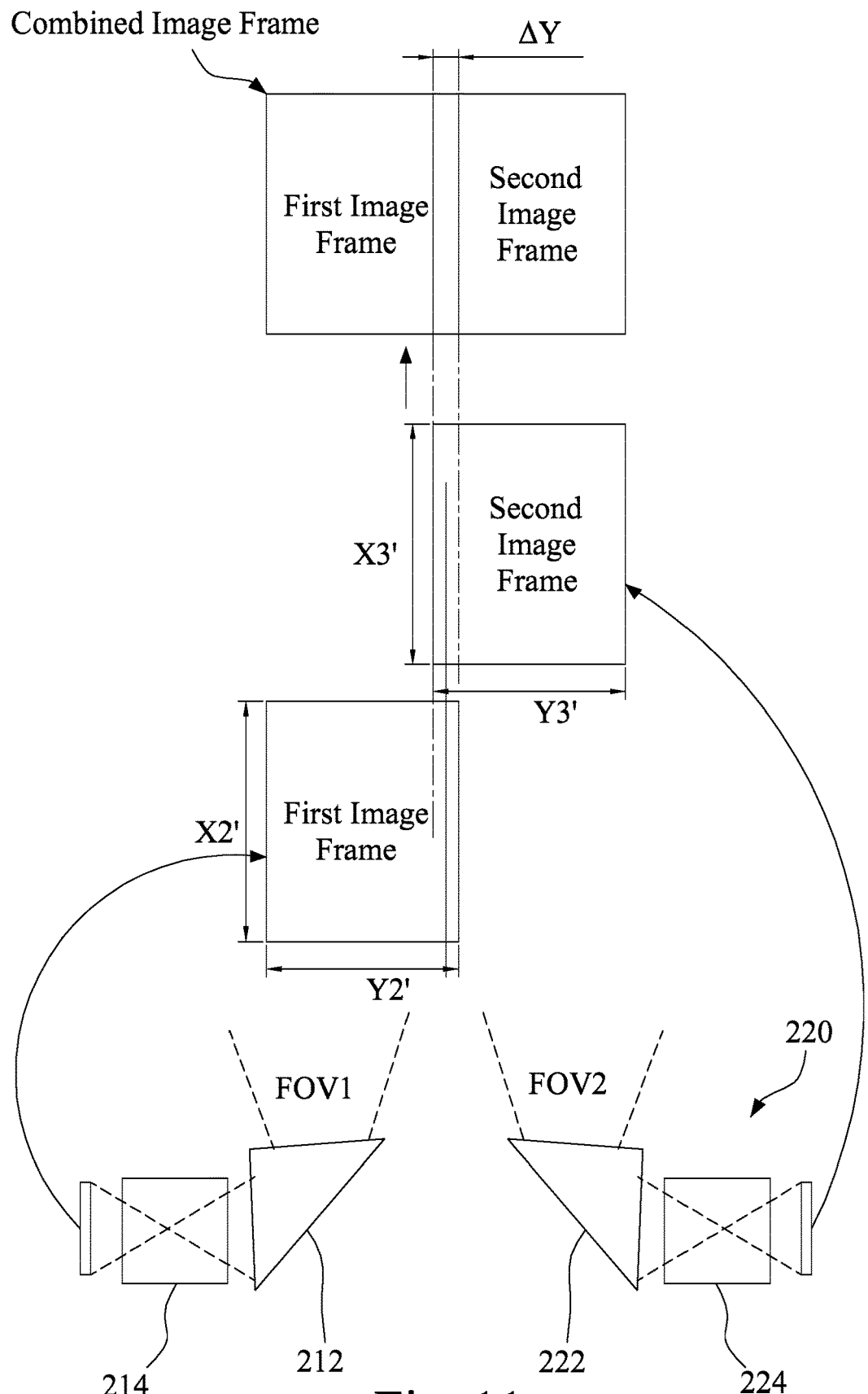
FIG. 11 is another schematic diagram illustrating the first field-of-view, the second field-of-view, a first image frame, a second image frame, and a combined image frame of the image capture assembly of the first embodiment.

As shown in FIG. 10 and FIG. 11, Arrangement of the same first image sensor 216 and the same second image sensor 226 can be changed to generate another combined image frame having a different aspect ratio of display resolution, to meet another display screen 130 having a different aspect ratio Y1:X1. Provided that the aspect ratio Y1:X1 of the display screen 130 is changed to be 6:4, by turning the first image sensor 216 and the second image sensor 226 by 90 degrees respectively with respect to the optical axis thereof, the relative position between the longer side and the shorter side of the image capture assembly 200 is changed in the top view and the side view. At this time, the relation between the vertical resolutions and the horizontal resolutions of the first image frame, the second image frame and the combined image frame/the display screen 130 is changed, such that the aspect ratio of the new combined image frame meets a display screen 130 having an aspect ratio Y1:X1 of about 6:4.

In the new arrangement, the vertical resolutions of the first image frame and the second image frame in the longitudinal direction Y are respectively changed to Y2' and Y3', and the horizontal resolutions of the first image frame and the second image frame in the horizontal direction X are respectively changed to X2' and X3. Image sensing capabilities of the first image sensor 216 and the second image sensor 226 are not changed, and the relations of the resolutions before and after the change are as follows:

X2'=Y2; X3'=Y3; Y2'=X2; and Y3'=X3.

In the specific embodiment, ignoring the overlapping angle, After respectively turning the image sensors 216, 226 for capturing Y2:X2=Y3:X3=4:3 vertical to horizontal dimension ratio image by 90 degrees with respect the optical axes, the image sensors 216, 226 became image sensors for capturing Y2':X2'=Y3':X3'=3:4 vertical to horizontal dimension ratio image to meet the display screen 130 having an the aspect ratio Y1:X1 of 6:4. And to meet the new display screen 130, the mathematical formula expressing the relation between the vertical resolutions and the horizontal resolutions is modified as follows:

$$\frac{Y2'+Y3'}{X2'}=\frac{Y1}{X1}, \text{ and } X2'=X3'.$$

The overlapping angle is required for the allowance for assembly parts. For example, in FIG. 6, an overlapping angel falling within a range of −8-8 degrees defined by the field-of-views FOV1, FOV2 of the first optical module 210 and the second optical module 220, and the first image frame and the second image frame overlap to define the overlapping section ΔY in the longitudinal direction Y, so that the mathematical formula expressing the relation between the vertical resolutions and the horizontal resolutions is modified as follows:

$$\frac{Y2'+Y3'}{X2'}>\frac{Y1}{X1}, \text{ and } X2'=X3'.$$

The mathematical formula can be further modified as follows:

$$\frac{Y2'+Y3'-\Delta Y}{X2}=\frac{Y1}{X1}, \text{ and } X2'=X3'.$$

Figure 12:
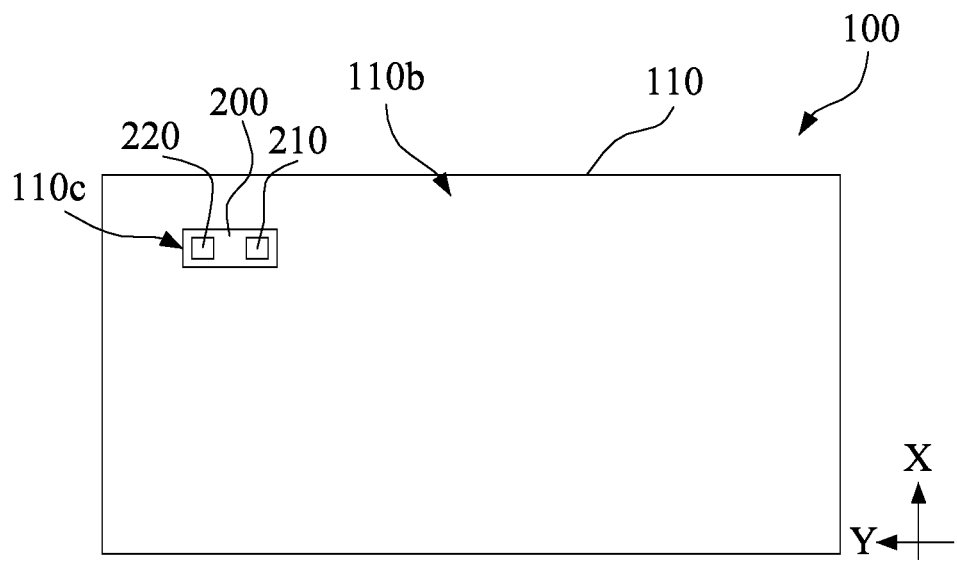
FIG. 12 is a rear view of a portable electronic device according to a second embodiment of this disclosure.
Figure 13:
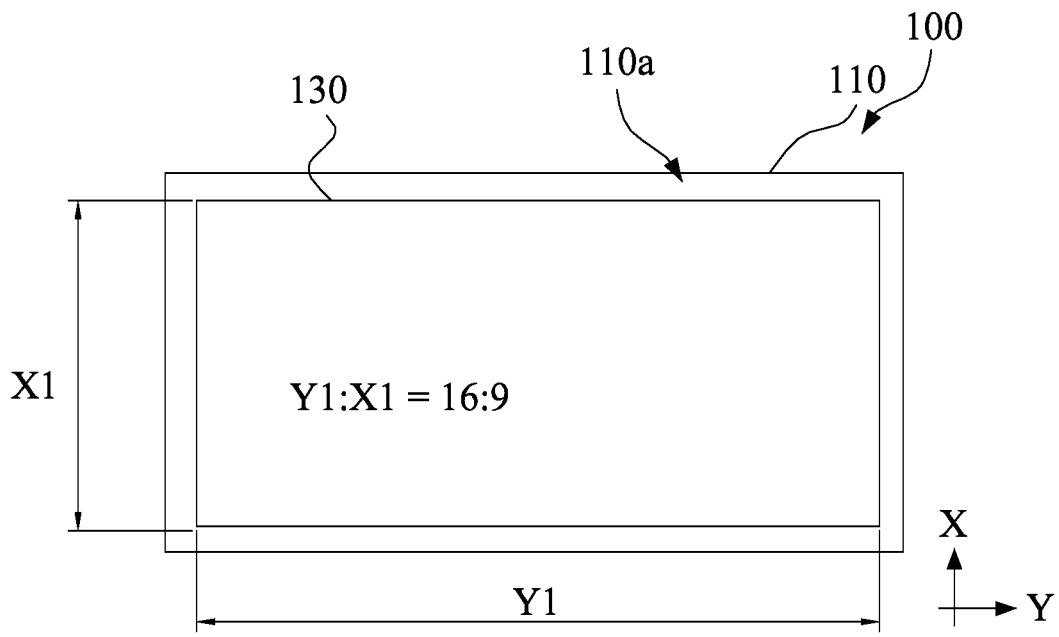
FIG. 13 is a front view of the portable electronic device according to the second embodiment.
Figure 14:
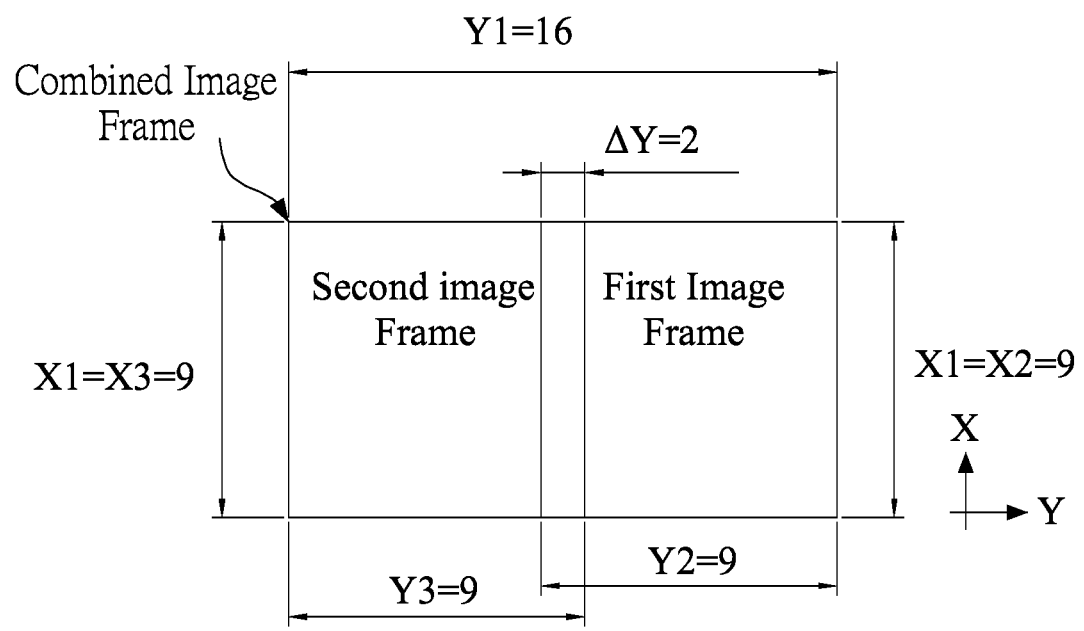
FIG. 14 is a schematic view illustrating the first image frame, the second image frame, and the combined image frame of the image capture assembly according to the second embodiment.

Refer to FIG. 12, FIG. 13, and FIG. 14, a portable electronic device 100 according to a second embodiment of this disclosure is illustrated. The first optical module 210 and the second optical module 220 are located within a window 110c of the case body 110 to capture images from the rear side surface 110b through the window 110c. The display screen 130 is disposed to the front side surface 110a and has a display aspect ratio of Y1:X1=16:9. The second embodiment is to illustrate another combination of image sensors 216, 226 and display screen 130 having different a resolution relation. And numbers in FIG. 14 are provided to illustrate the resolution proportion, not to indicate actual resolution pixels.

As shown in FIG. 13 and FIG. 14, in the second embodiment, the aspect ratio Y1:X1 of the display screen 130 is 16:9. The first image sensor 216 and the second image sensor 226 are square optical sensor arrays (not shown in the drawings), that is, the resolutions X2, X2, Y3, Y3 of the first image frame and the second image frame in the horizontal direction X and the longitudinal direction Y are all the same. Provided that X2=X3=Y2=Y3=9 for the following description In the longitudinal direction Y, the vertical resolutions Y2, Y3 of the first image frame and the second image frame can be adjusted by the image synthesis module 129, to meet the vertical resolution Y1 of the display screen 130. In the longitudinal direction Y, the sum of vertical resolutions Y2+Y3 of the first image frame and the second image frame after being adjusted is larger than the vertical resolution Y1 of the display screen 130. Therefore, the overlapping angle defined by overlapping the field-of-views FOV1, FOV2 of the first image sensor 216 and the second image sensor 226 is required, to form the overlapping section having a vertical resolution ΔY in the longitudinal direction Y. Provided that ΔY=2 for the following description, ΔY is arranged to be that Y2+Y3−ΔY=Y1. For example, 9+9−2=16, shown in FIG. 14. Thus, the aspect ratio of the combined image frame meets the display aspect ratio of the display screen 130.

Figure 15:
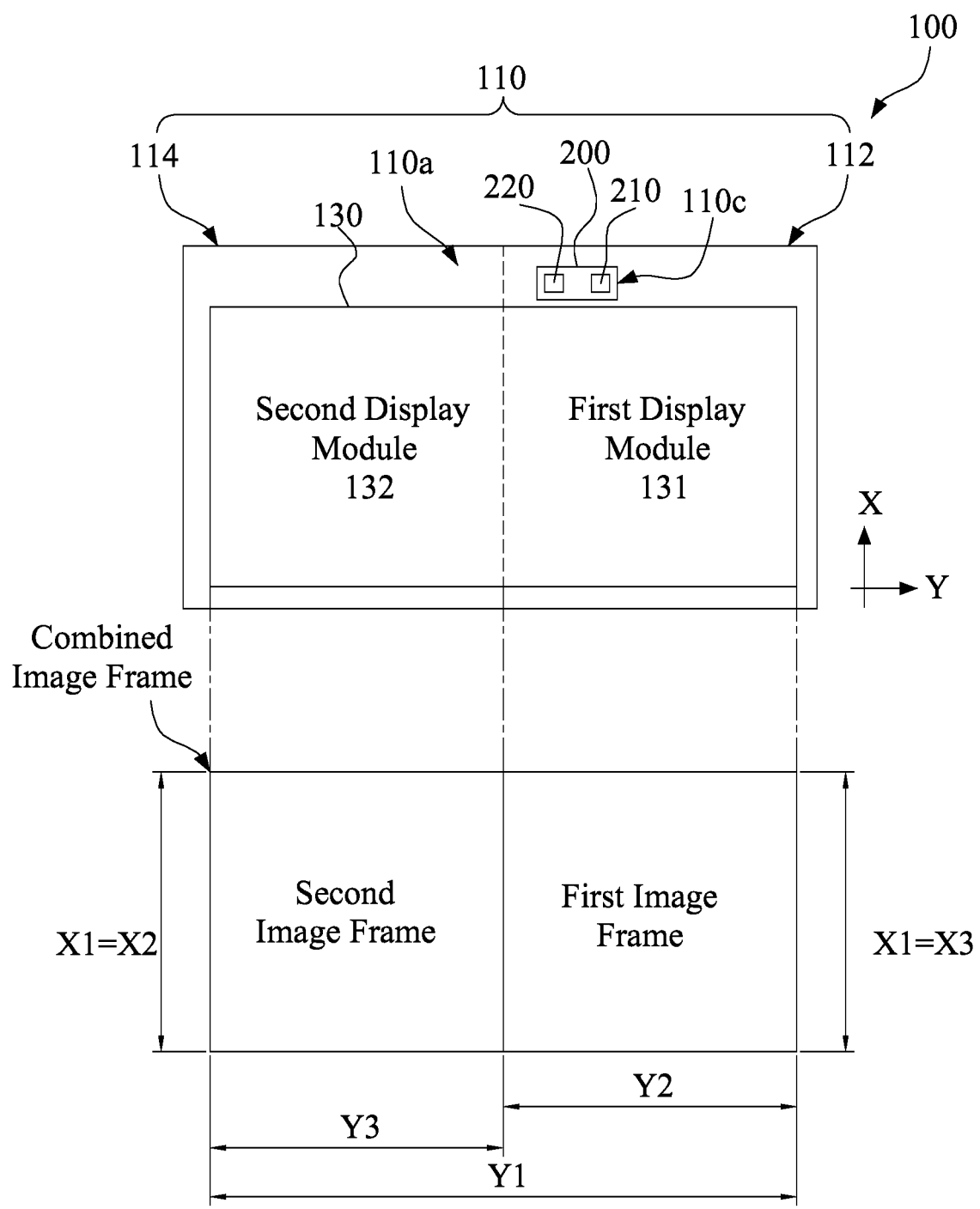
FIG. 15 is a schematic view illustrating the front view of the portable electronic device and the combined image frame according to a third embodiment of this disclosure.
Figure 16:
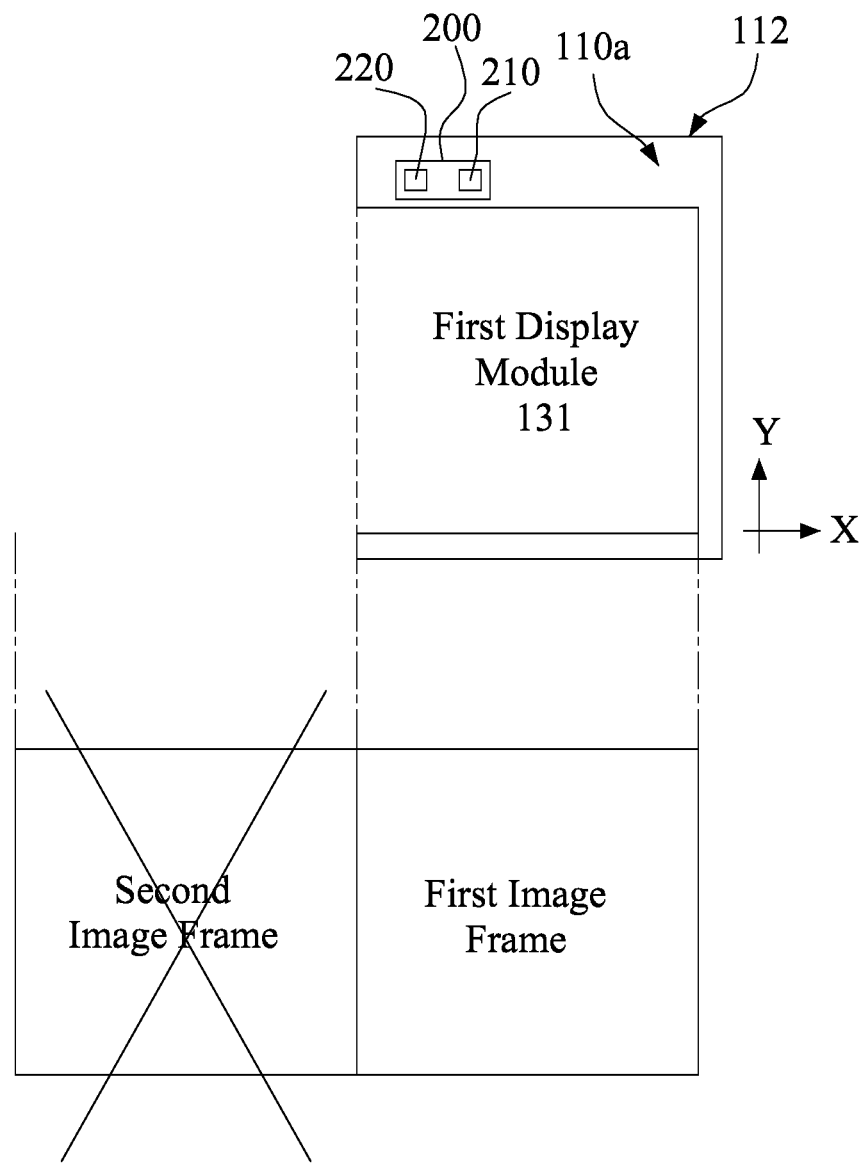
FIG. 16 is a schematic view illustrating the front view of a first sub case body of the portable electronic device and the combined image frame according to the third embodiment.

Refer to FIG. 15 and FIG. 16; a portable electronic device 100 according to a third embodiment of this disclosure is illustrated. The portable electronic device 100 of the third embodiment is a foldable device. The case body 110 includes a first sub case body 112 and a second sub case body 114. The first sub case body 112 is pivoted to the second sub case body 114. The display screen 130 is disposed to the front side surface 110a of the case body 110. The display screen 130 includes a first display module 131 and a second display module 132. The first display module 131 is disposed to the first sub case body 112, and the second display module 132 is disposed to the second sub case body 114. The first display module 131 and the second display module 132 are on the front side surface 110a of the case body 110 and arranged in parallel to the longitudinal direction Y.

The display screen 130 can be but not limited to a flexible display panel, and the first display module 131 and the second display module 132 are different sections on the flexible display panel. The first display module 131 and the second display module 132 can be controlled individually, so as to be enabled and disabled individually. The implement of the display screen 130 is not limited to the flexible display panel. In one embodiment, the first display module 131 and the second display module 132 are two independent display panels and are pivoted to each other directly or indirectly through pivoting mechanisms.

As shown in FIG. 15 and FIG. 16, the image capture assembly 200 is disposed in the first sub case body 112, and the first optical module 210 and the second optical module 220 capture images from the front side surface 110a through a window 110c of the first sub case body 112. The first optical module 210 and the second optical module 220 are arranged on the front side surface 110a in parallel to the longitudinal direction Y, to respectively capture the first image frame and the second image frame.

As shown in FIG. 15, the first image frame is arranged to meet an aspect ratio of the first display module 131, and the second image frame is arranged to meet the aspect ratio of the second display module 132. The first display module 131 and the second display module 132 are respectively adapted to display the first image frame and the second image frame. Thus, in full screen mode, the display screen 130 displays the combined image frame. At this time, a relation between the vertical resolutions and the horizontal resolutions of the first image frame, the second image frame, the combined image frame, and the display screen 130 is expressed by a mathematical formula:

$$\frac{Y2+Y3}{X2} > \frac{Y1}{X1}, \text{ and } X2 = X3.$$

The third embodiment differs from the first embodiment in that the overlapping section having a vertical resolution ΔY in the longitudinal direction Y due to the overlapping angle is cropped by the data processing circuit 130 when the data processing circuit 130 drives the first display module 131 and the second display module 132 to respectively display the first image frame and the second image frame.

As shown in FIG. 16, when the portable electronic device 100 is folded, the display screen 130 is also folded. Under such circumstance, only one of the two display modules 131, 132 is capable to be used. Taking FIG. 16 as an illustration, when the first sub case body 112 is swiveled and folded on the second sub case body 114 with the first display module 131 and the second display module 132 respectively exposed on the first sub case body 112 and the second sub case body 114, the first display module 131 faces the user, and the second display module 132 is flipped to the back side of the second sub case body 114. At this time, controlled by the data processing circuit 120 (as shown in FIG. 3), the first display module 131 and the first optical module 210 remain enabled, such that the first optical module 210 and first image sensor 216 keep on capturing the first image frame, and the first display module 131 keeps on displaying the first image frame. Meanwhile, the data processing circuit 120 disables the second display module 132 and the second image sensor 226, so as to reduce energy consumption and prevent from consuming the processing computing capability of the data processing circuit 120.

Figure 17:
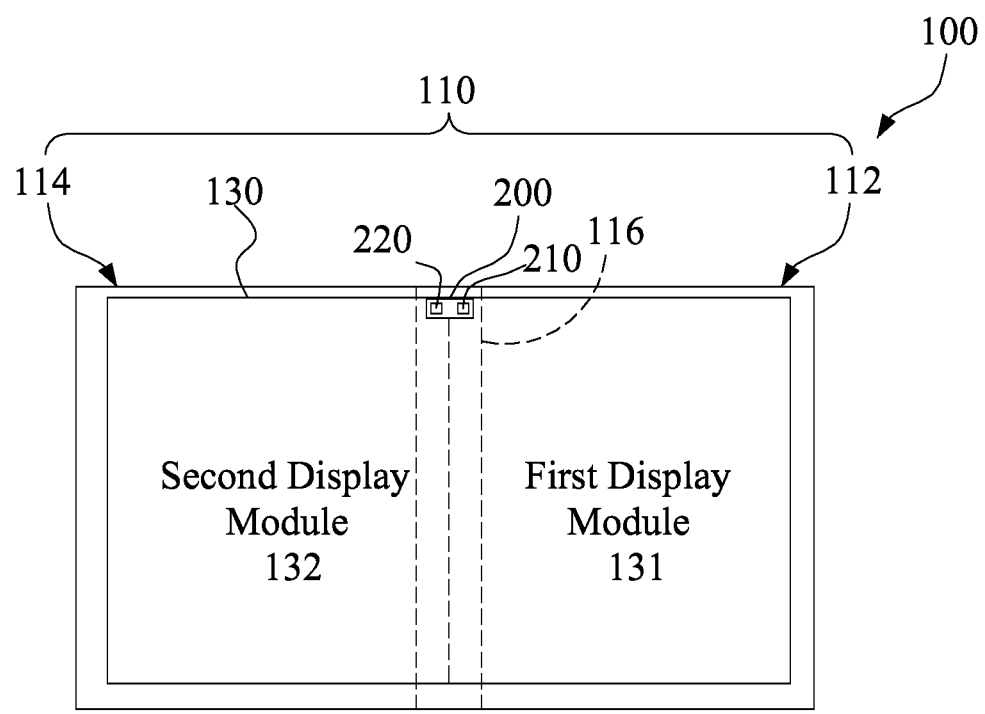
FIG. 17 is a front view of a portable electronic device according to a fourth embodiment of this disclosure.

Refer to FIG. 17; a portable electronic device 100 according to a fourth embodiment of this disclosure is illustrated. The fourth embodiment is similar to the third embodiment, and differs from that the portable electronic device 100 further includes a hinge member 116, and the hinge member 116 is provided to pivot the first sub case body 112 to the second sub case body 114. The image capture assembly 200 is disposed to the hinge member 116, and the first optical module 210 and the second optical module 220 are still arranged on the front side surface 110a to captures image from the front side surface 110a.

In this disclosure, the image capture assembly captures images by utilizing two optical modules having smaller field-of-views, and then merges the captured images into a combined image frame equivalent to an image captured in a wide-view-angle. In comparison with a wide-view-angle image captured by a single optical module, image distortions in images captured within close range by the two optical modules of this disclosure are much less, and the image distortion correction becomes easier to do, so as to reduce the processing load of computing when the data processing circuit 120 executes image processing. Moreover, in some embodiments of this disclosure, by changing the arrangement of the image sensors 216, 226 in the longitudinal direction Y and the horizontal direction X, aspect ratio of the combined image frame generated by the image capture assembly can be easily changed, and the same image sensors 216, 226 can be adapted to display screens 130 having different aspect ratios.

What is claimed is:

1. An image capture assembly, comprising:
   a first optical module and a first image sensor disposed corresponding to the first optical module; wherein the first optical module is adapted to capture an image in a first field-of-view to project the image on the first image sensor, such that the first image sensor generates a first image frame; wherein a vertical resolution of the first image frame is Y2 while a horizontal resolution of the first image frame is X2;
   a second optical module and a second image sensor disposed corresponding to the second optical module; wherein the second optical module is adapted to capture another image in a second field-of-view to project the another image on the second image sensor, such that the second image sensor generates a second image frame; wherein the vertical resolution of the second image frame is Y3 while the horizontal resolution of the second image frame is X3;
      wherein the first optical module and the second optical module are arranged in parallel to a longitudinal direction, and the vertical resolutions of the first image frame and the second image frame correspond to the longitudinal direction; and
   a data processing circuit, electrically connected to the first image sensor and the second image sensor; wherein the data processing circuit is adapted to merge the first image frame and the second image frame in the longitudinal direction to generate a combined image frame; wherein the vertical resolution of the combined image frame is Y1, the horizontal resolution of the combined image frame is X1; and Y1>X1;
   wherein relation between the vertical resolutions and the horizontal resolutions is expressed by a mathematical formula:

$$\frac{Y2+Y3}{X2} > \frac{Y1}{X1}, \text{ and } X2 = X3.$$

2. The image capture assembly as claimed in claim 1, further comprising a fixation member, wherein the first optical module, the first image sensor, the second optical module, and the second image sensor are fixed on the fixation member.

3. The image capture assembly as claimed in claim 1, wherein:
   the first optical module comprises a first prism and a first lens set located between the first prism and the first image sensor, the first prism is adapted to capture the image in the first field-of-view and to project the image on the first image sensor through the first lens set; and
   the second optical module comprises a second prism and a second lens set located between the second prism and the second image sensor, the second prism is adapted to capture the another image in the second field-of-view and to project the another image on the second image sensor through the second lens set; wherein optical axes of the first lens set and the second lens set are arranged in parallel to the longitudinal direction.

4. The image capture assembly as claimed in claim 1, wherein the first field-of-view and the second field-of-view overlap to define an overlapping angle.

5. The image capture assembly as claimed in claim 4, wherein the overlapping angle falls within a range of −10-10 degrees with respect to an image capture direction of the image capture assembly.

6. The image capture assembly as claimed in claim 1, wherein the first image frame and the second image frame overlap to define an overlapping section within the combined image frame, the vertical resolution of the overlapping section is ΔY, and $$\frac{Y2+Y3-\Delta Y}{X2} = \frac{Y1}{X1}.$$

7. A portable electronic device, comprising:
   the image capture assembly as claimed in claim 1; and
   a display screen, having a display resolution measuring Y1 pixels in the longitudinal direction and X1 pixels in a horizontal direction, and Y1>X; wherein the data processing circuit is electrically connected to the display screen and adapted to drive the display screen to display the combined image frame.

8. The portable electronic device as claimed in claim 7, further comprising a case body including a front side surface and a rear side surface; wherein the display screen is disposed to the front side surface, and the image capture assembly is disposed to the case body.

9. The portable electronic device as claimed in claim 8, wherein the display screen comprises a first display module and a second display module, the first image frame is arranged to meet an aspect ratio of the first display module, and the second image frame is arranged to meet the aspect ratio of the second display module.

10. The portable electronic device as claimed in claim 8, wherein the first display module and the second display module are arranged in parallel to the longitudinal direction.

11. The portable electronic device as claimed in claim 8, wherein and the first optical module and the second optical module capture the images on the rear side surface.

12. The portable electronic device as claimed in claim 8, wherein the case body comprises a first sub case body and a second sub case body, the first sub case body is pivoted to the second sub case body, the first display module is disposed to the first sub case body, and the second display module is disposed to the second sub case body.

13. The portable electronic device as claimed in claim 12, wherein the image capture assembly is disposed to the first sub case body, and the first optical module and the second optical module capture the images on the front side surface.

14. The portable electronic device as claimed in claim 13, wherein when the first sub case body is folded on the second sub case body with the first display module and the second display module reactively exposed on the first sub case body and the second sub case body, the data processing circuit disables the second display module and the second image sensor.

15. The portable electronic device as claimed in claim 12, further comprising a hinge member adapted to pivot the first sub case body to the second sub case body, wherein the image capture assembly is disposed to the hinge member, and the first optical module and the second optical module capture the images on the front side surface.

16. The portable electronic device as claimed in claim 7, wherein the image capture assembly further comprises a fixation member, and the first optical module, the first image sensor, the second optical module, and the second image sensor are fixed on the fixation member.

17. The portable electronic device as claimed in claim 7, wherein:
the first optical module comprises a first prism and a first lens set located between the first prism and the first image sensor, the first prism is adapted to capture the image in the first field-of-view and to project the image on the first image sensor through the first lens set; and
the second optical module comprises a second prism and a second lens set located between the second prism and the second image sensor, the second prism is adapted to capture the another image in the second field-of-view and to project the another image on the second image sensor through the second lens set; wherein optical axes of the first lens set and the second lens set are arranged in parallel to the longitudinal direction.

18. The portable electronic device as claimed in claim 7, wherein the first field-of-view and the second field-of-view overlap to define an overlapping angle.

19. The portable electronic device as claimed in claim 18, wherein the overlapping angle falls within a range of −10-10 degrees with respect to an image capture direction of the image capture assembly.

20. The portable electronic device as claimed in claim 7, wherein the first image frame and the second image frame overlap to define an overlapping section within the combined image frame, the vertical resolution of the overlapping section is ΔY, and $$\frac{Y2 + Y3 - \Delta Y}{X2} = \frac{Y1}{X1}.$$

* * * * *

UNITED STATES PATENT AND TRADEMARK OFFICE
CERTIFICATE OF CORRECTION

PATENT NO.        : 10,979,634 B2
APPLICATION NO.   : 16/872943
DATED             : April 13, 2021
INVENTOR(S)       : Shih-Chieh Yen et al.

Page 1 of 1

It is certified that error appears in the above-identified patent and that said Letters Patent is hereby corrected as shown below:

On the Title Page

Change:
"(73) Assignees: GUANGZHOU LUXVISIONS INNOVATION TECHNOLOGY LIMITED; GUANGZHOU HI-TECH INDUSTRIAL DEVELOPMENT"

To:
--(73) Assignee: GUANGZHOU LUXVISIONS INNOVATION TECHNOLOGY LIMITED, Guangzhou Hi-tech Industrial Development (CN)--

Signed and Sealed this
Sixteenth Day of November, 2021

Drew Hirshfeld
*Performing the Functions and Duties of the*
*Under Secretary of Commerce for Intellectual Property and*
*Director of the United States Patent and Trademark Office*